(12) United States Patent
Nie et al.

(10) Patent No.: US 12,335,618 B1
(45) Date of Patent: Jun. 17, 2025

(54) OPTICAL IMAGE STABILIZATION (OIS) CONTROL MODE WITH PER-IMAGE FRAME RECENTERING

(71) Applicant: Apple Inc., Cupertino, CA (US)

(72) Inventors: Jianbin Nie, Sunnyvale, CA (US); Santiago Alban, Mountain View, CA (US); Yunfeng Li, Fremont, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 18/474,558

(22) Filed: Sep. 26, 2023

(51) Int. Cl.
*H04N 23/68* (2023.01)
*H04N 25/53* (2023.01)

(52) U.S. Cl.
CPC ......... *H04N 23/683* (2023.01); *H04N 23/687* (2023.01); *H04N 25/53* (2023.01)

(58) Field of Classification Search
CPC ..... H04N 23/683; H04N 23/687; H04N 25/53
See application file for complete search history.

(56) References Cited

U.S. PATENT DOCUMENTS

| | | | | |
|---|---|---|---|---|
| 5,930,531 A * | 7/1999 | Kitagawa | ............... | G03B 39/00 |
| | | | | 348/E5.046 |
| 10,412,306 B1 * | 9/2019 | Soman | ................. | H04N 23/631 |
| 10,609,288 B1 * | 3/2020 | Kulik | ................. | H04N 23/6812 |
| 11,190,689 B1 * | 11/2021 | Wang | ................... | H04N 23/683 |
| 11,539,887 B2 * | 12/2022 | Li | ....................... | H04N 23/6811 |
| 11,856,295 B2 * | 12/2023 | Wang | ..................... | H04N 23/69 |
| 2009/0219402 A1 * | 9/2009 | Schneider | ............. | H04N 23/68 |
| | | | | 348/208.7 |
| 2017/0272656 A1 * | 9/2017 | Kurata | ................... | H04N 23/63 |
| 2019/0132516 A1 * | 5/2019 | Li | ....................... | H04N 23/6812 |
| 2020/0137308 A1 * | 4/2020 | Kulik | ................. | H04N 23/6812 |

* cited by examiner

*Primary Examiner* — Padma Haliyur
(74) *Attorney, Agent, or Firm* — Blank Rome LLP (57) ABSTRACT

Devices, methods, and non-transitory program storage devices are disclosed to provide optical image stabilization (OIS) systems having a control mode with per-image frame recentering. Due to the mechanical limits of OIS systems' movement stroke, OIS systems are typically limited to being able compensate for no more than a few degrees of camera device rotation. If the device rotation motion is larger than the OIS movement stroke, the OIS movement becomes saturated, and the OIS is not able to compensate for the device's rotation motion anymore, which could generate image blurring. In order to handle relatively large device rotation motion and increase the exposure time for video capture under low-light scene conditions, it is desirable to utilize the limited OIS stroke more efficiently. This disclosure proposes new ideas for OIS systems that opportunistically re-center themselves over a time duration at the beginning of each video image frame to reduce image blurring.

20 Claims, 5 Drawing Sheets

OPTICAL IMAGE STABILIZATION (OIS) CONTROL MODE WITH PER-IMAGE FRAME RECENTERING

TECHNICAL FIELD

This disclosure relates generally to the field of image capture. More particularly, but not by way of limitation, it relates to embodiments for an optical image stabilization (OIS) system having a control mode with per-image frame recentering.

BACKGROUND

Handheld or personal electronic video image capture devices often employ video image stabilization (VIS), e.g., involving electronic image stabilization (EIS) operations and/or OIS stabilization operations, on captured video images frames to stabilize the captured video.

One way to stabilize a video is to track a salient feature in the image and use it as an anchor point to "cancel out" all perturbations in the scene relative to it. However, this approach requires a priori knowledge of the image's content to, for example, identify and track a person or other salient object in the scene. Another approach to image stabilization searches for a "background plane" in a video sequence and uses its observed distortion to correct for camera motion. These types of techniques that involve software- and/or hardware-enabled transformations to "warp" a captured image so as to "cancel out," i.e., stabilize, the jitter caused by camera movement after-the-fact are sometime referred to as "electronic image stabilization" or EIS techniques. Another approach may use the output from a motion sensor, e.g., a gyroscope or inertial measurement unit (IMU), as an input for estimating the amount of "warping" that needs to be done via the EIS transformations, i.e., in order to stabilize the captured video image frames.

In other approaches to video stabilization, gyroscopically-controlled electromagnets (or other suitable mechanisms) may be used to shift a floating lens element, e.g., moving such lens elements orthogonally to the lens barrel axis (i.e., the "optical axis") along the horizontal and vertical plane of the image and/or along the optical axis in a direction that is opposite to that of the camera's movement. Doing this can effectively neutralize any signs of camera shake.

In a similar type of video stabilization operation, a camera's image sensor may be made to translate in the opposite direction of the camera's movements, i.e., in order to dampen the effects of camera shake. These types of techniques that involve hardware-enabled corrections in the position of the image capture device apparatus, e.g., by moving one or more elements in the optical stack, the image sensor itself, or the entire camera system, so as to "cancel out" the jitter caused by camera movement in "real-time" will be referred to herein as "optical image stabilization" or OIS techniques. OIS techniques may involve the use of systems that apply 2D motion compensation (e.g., in just the x- and y-axial directions), or even 3D motion compensation (e.g., including camera elements that are capable of being shifted by the OIS system in the x-, y-, and z-axial directions, such as by a gimbal actuator mechanism, or the like).

Traditional OIS techniques may begin with the OIS system moving away from its "center" position (as needed) at the beginning of a video image capture operation and then continuing to compensate for camera device rotation/shake/motion for the duration of the video capture operation, which could easily cause the OIS system to eventually reach it's so-called "stroke limit," beyond which it may no longer be able to apply additional hardware-enabled corrections to attempt to cancel out camera movement. The stroke limit of the OIS system may be reached in reaction to large and/or fast camera motion during video capture—or even in response to more slow and consistent camera motion over time, such as a during a camera panning operation.

Thus, it would be desirable to have an improved OIS system that can significantly reduce the chance of hitting its OIS stroke limit, greatly improve the capability of compensating for the camera device's motion, and thus considerably increase the available image sensor exposure time for use in capturing in low-light scene conditions-all without exacerbating image blurring.

SUMMARY

Devices, methods, and non-transitory program storage devices are disclosed herein to provide optical image stabilization (OIS) systems having a control mode with per-image frame recentering.

Due to the mechanical limits of OIS systems' movement stroke, OIS systems are typically limited to being able compensate for no more than a few degrees of camera device rotation. If the device rotation motion is larger than the OIS movement stroke, the OIS movement becomes saturated, and the OIS is not able to compensate for the device's rotation motion anymore, which could generate image blurring.

In order to handle relatively large device rotation motion and increase the exposure time for video capture under low-light scene conditions, it is desirable to utilize the limited OIS stroke more efficiently. This disclosure proposes new ideas for OIS systems that opportunistically re-center themselves over a time duration at the beginning of each video image frame to reduce image blurring.

According to some embodiments, there is provided a device, comprising: a first image capture device, wherein the first image capture device comprises an image sensor; and a first lens having a first set of lens characteristics; an optical image stabilization (OIS) system configured to position the image sensor relative to the first lens during the capture of a video image stream; a memory; and one or more processors operatively coupled to the memory, wherein the one or more processors are configured to execute instructions causing the one or more processors to: obtain a first image frame captured by the first image capture device as part of the video image stream, wherein the first image frame is captured during a first frame interval, and wherein the first frame interval comprises: an image sensor recentering period, during which the OIS system moves the image sensor towards a center position relative to the first lens; an image sensor exposure period, during which the image sensor captures at least the first image frame, and during which the OIS system positions the image sensor relative to the first lens to compensate for movement of the first image capture device during the image sensor exposure period; and an image sensor readout period, during which image information relating to at least the first image frame is read out from the image sensor.

According to some embodiments, the image sensor recentering period occurs prior to the image sensor exposure period and the image sensor readout period within the first frame interval.

According to some embodiments, a duration of the image sensor recentering period is determined dynamically, based, at least in part, on a duration of the image sensor exposure period for the first frame interval.

According to some embodiments, a maximum duration of the image sensor exposure period is determined dynamically.

According to some embodiments, the image sensor recentering period comprises an image sensor overshoot period and an image sensor settling period.

According to some embodiments, the OIS system moving the image sensor towards a center position relative to the first lens during the image sensor recentering period further comprises: moving the image sensor to a first position that is partially to the center position. According to some such embodiments, the first position becomes a starting position for the OIS system to compensate for movement of the first image capture device during the image sensor exposure period.

According to some embodiments, the OIS system moving the image sensor towards a center position relative to the first lens during the image sensor recentering period further comprises: moving the image sensor to the center position.

According to some embodiments, the image sensor exposure period further comprises the image sensor capturing a second image frame using a different integration time than was used for the first image frame.

According to some embodiments, the OIS system further comprises a gimbal actuator.

According to some embodiments, the one or more processors are further configured to execute instructions causing the one or more processors to: obtain a second image frame captured by the first image capture device subsequently to the first image frame as part of the video image stream, wherein the second image frame is captured during a second frame interval, and wherein the second frame interval comprises: a second image sensor recentering period, during which the OIS system moves the image sensor towards a center position relative to the first lens; a second image sensor exposure period, during which the image sensor captures at least the second image frame, and during which the OIS system positions the image sensor relative to the first lens to compensate for movement of the first image capture device during the second image sensor exposure period; and a second image sensor readout period, during which image information relating to at least the second image frame is read out from the image sensor.

According to some such embodiments, the image sensor recentering period for the first frame interval has a different duration than the second image sensor recentering period for the second frame interval.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image capture and processing methods are also disclosed herein, in accordance with the device and NPSD embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Exemplary Optical Image Stabilization Operations and Image Frame Intervals

Figure 1A:
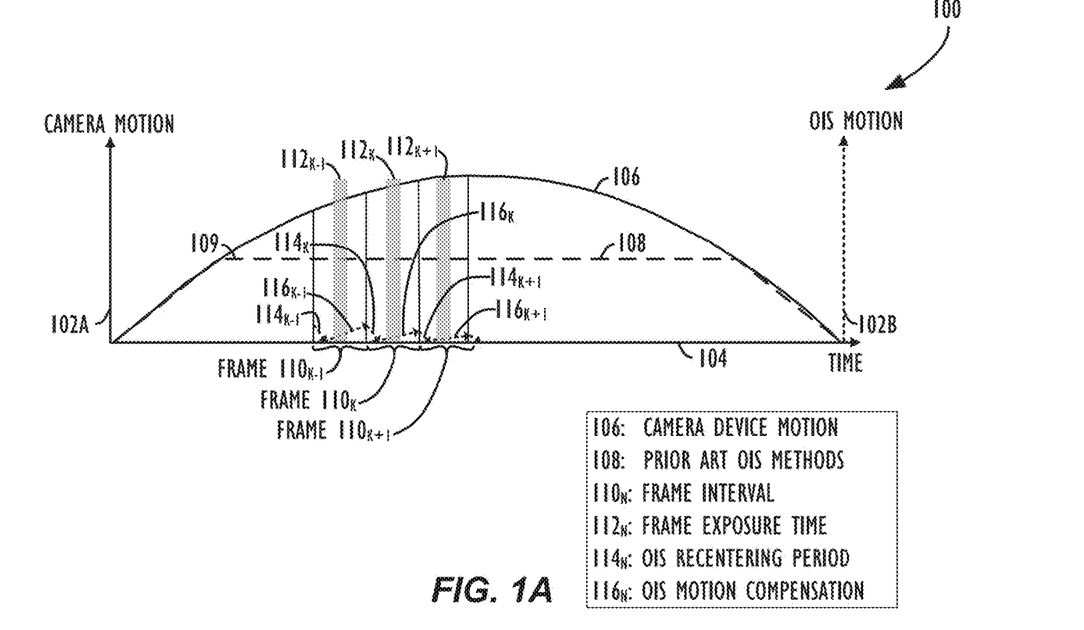
FIG. 1A illustrates various OIS methods, according to various embodiments.

Turning now to FIG. 1A, an example 100 of various OIS methods is shown. As shown on the graph of example 100, the vertical axis 102 represents both camera motion (as labeled by the solid line on axis 102A on the left-hand side of the graph), as well as OIS system motion (as labeled by the dashed line on axis 102B on the right-hand side of the graph), while the horizontal axis 104 represents time, e.g., in the form of the sequential capture of individual image frames.

Line 106 represents the movement of an exemplary electronic device with a camera being used to capture a video image stream. The vertical axis of the graph of example 100 may be thought of as representing an amount of device motion in an arbitrary direction (e.g., a positive x-axial direction, a negative y-axial direction, etc.).

Dashed line 108 represents the movement of an exemplary prior art OIS system that attempts to use a continuous/smooth trajectory to compensate for the movement of the camera. However, according to such prior art systems, the OIS system may eventually reach a stroke limit or a so-called point of "saturation" (e.g., as illustrated at point 109 on dashed lin 108), e.g., after approximately 1-2 degrees of motion compensation. After the stroke limit of the OIS system is reached, additional movement by the camera device (e.g., as represented by the portion of line 106 that continues above dashed line 108) is not able to be compensated for by the camera's OIS system.

By contrast, lines 114/116 represent the movement of an improved OIS system, embodiments of which are described in further detail herein. As shown in the graph of example 100, during a first frame interval $110_{K-1}$, the improved OIS system may first attempt to recenter the OIS system during an image sensor recentering period (represented by line segment $114_{K-1}$) that occurs prior to the corresponding image frame K–1's image sensor exposure period (represented by shaded region $112_{K-1}$). The improved OIS system may also track the motion of the device during the capture of the corresponding image frame K–1 (represented by line segment $116_{K-1}$), so that the OIS system may also attempt compensate for such camera device motion and reduce or avoid image blurring.

Moving forward in time along axis 104, it may be seen that during a next frame interval $114_K$, the improved OIS system again attempts to recenter the OIS system (i.e., from wherever it ended up at the end of frame interval $110_{K-1}$) during another image sensor recentering period (represented by line segment $114_K$) that again occurs prior to the corresponding image frame K's image sensor exposure period (represented by shaded region $112_K$). The improved OIS system may again track the motion of the device during the capture of the corresponding image frame K (represented by line segment $116_K$), so that the OIS system may attempt compensate for camera device motion and reduce or avoid image blurring.

Finally, moving forward in time again along axis 104, it may be seen that during a next frame interval $114_{K+1}$, the improved OIS system again attempts to recenter the OIS system (i.e., from wherever it ended up at the end of frame interval $110_K$) during yet another image sensor recentering period (represented by line segment $114_{K+1}$) that again occurs prior to the corresponding image frame K+1's image sensor exposure period (represented by shaded region $112_{K+1}$). The improved OIS system may again track the motion of the device during the capture of the corresponding image frame K+1 (represented line segment $116_{K+1}$), so that the OIS system may attempt compensate for camera device motion and reduce or avoid image blurring.

As may now be appreciated, in the graph of example 100, the OIS system was able to completely recenter itself (i.e., as represented by the fact that the line segments 114N are able to returning all the way down to horizontal axis 104) prior to the beginning of the corresponding frame exposure periods 112N. However, if, in a given instance, the OIS system does not have sufficient time to get all the way back to completely recenter itself during the image sensor recentering period (e.g., due to a larger portion of the frame interval being reserved for image sensor exposure time, or the like), then the OIS system may advantageously return at least partially to its center position (and, importantly, in the correct direction), while using its position at the end of the image sensor recentering period as the starting position for the OIS system to begin to compensate for device movement during the image frame exposure time (i.e., as represented by line segments 116N).

Figure 1B:
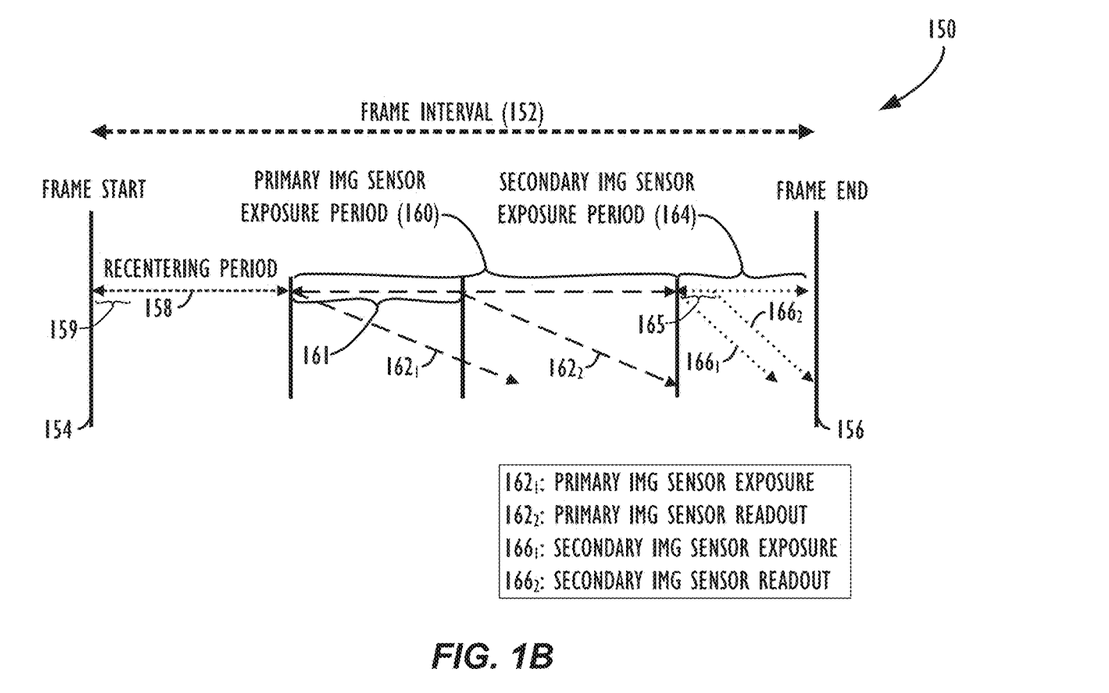
FIG. 1B illustrates an exemplary image frame interval period, according to various embodiments.

Turning now to FIG. 1B, a diagram 150 showing an exemplary image frame interval period is illustrated. The exemplary image frame interval period may begin at frame start time 154 and end at frame end time 156. The frame interval duration 152 reflects the period between frame start time 154 and frame end time 156, during which: OIS recentering operations, OIS motion compensation operations, image sensor exposure operation(s), and/or image sensor readout operation(s) for a particular image frame will occur during the capture of a video image stream by an image capture device. The frame interval duration 152 is then repeated for each captured image frame of a video image stream (with the understanding that the amount of time allotted for the exposure time of image frame(s) in a given frame interval, and thus the amount of time allotted to the image sensor recentering period, too, may change over time, e.g., based on the determination of a camera auto exposure (AE) system, a pre-set maximum image sensor integration time, or the like).

Beginning first with image sensor recentering period 158, it is shown that a first portion of the frame interval duration 152 is reserved for the aforementioned attempts by the improved OIS systems disclosed herein to recenter the OIS system prior to the beginning of the next image sensor exposure period. As also described above, in some cases, recentering period 158 may be of a long enough duration that the OIS system may be able to completely recenter itself, while, in other cases, the OIS system may only be able to partially recenter itself period to the beginning of the next image sensor exposure period. In some embodiments, a portion 159 of the image sensor recentering period 158 may be dedicated to so called "forward delay," i.e., the delay caused by processing and/or synchronizing the image signal for the beginning of next image frame. In such cases, the OIS system recentering operations may be limited to only the portion of period 158 that is not overlapping with portion 159.

Moving forward in time within the frame interval duration 152, it may be seen that an exemplary primary or "first" image sensor exposure period 160 may begin. For example, the primary image sensor exposure period in a given frame interval may comprise an "EV0" image frame, i.e., an image frame captured with exposure settings as determined by a camera's Auto Exposure (AE) system. Dashed line arrow 162₁ represents the primary image sensor exposure process, with the arrow's move downward on the graph representing additional rows on an image sensor being exposed in a sequential order over time (e.g., as in the case of a rolling shutter image sensor). The exposure time for a given row(s) on the image sensor for the capture of the primary/first image is then represented by the distance (161) between dashed line arrow 162₁ and the corresponding portion of dashed line arrow 162₂, wherein line 162₂ represents the start of the primary image sensor readout process, i.e., wherein the captured pixel image data is read off the sensor and then stored to memory and/or transmitted to other parts of the image signal processing pipeline.

Moving forward in time within the frame interval duration 152, it may be seen that an exemplary secondary or "second" image sensor exposure period 164 may begin. For example, the secondary image sensor exposure period in a given frame interval may comprise an underexposed, or "EV-N" image frame, i.e., an image frame that is intentionally captured as underexposed (e.g., with a shorted image sensor integration time) as compared to the so-called "EV0" exposure settings as determined by the camera's AE system. Dashed line arrow 166₁ represents the secondary image sensor exposure process, with the arrow's move downward again representing additional rows on an image sensor being exposed in a sequential order over time (e.g., as in the case of a rolling shutter image sensor). The exposure time for a given row(s) on the image sensor for the capture of the secondary/second image is then represented by the distance (165) between dashed line arrow 166₁ and the corresponding portion of dashed line arrow 166₂, wherein line 166₂ the start of the secondary image sensor readout process. Note that, in this example, the exposure time 165 for the secondary/second image is substantially shorter than the exposure time 161 for the primary/first image, i.e., due to the second image in this example being an underexposed or "EV-N" style of image, relative to the "EV0" primary image.

As may now be appreciated, if there is less concern about an OIS system that is benefitting from the unique, per-frame recentering techniques disclosed herein reaching its "saturation" point (e.g., as was shown at point 109 on dashed lin 108 in FIG. 1A) and thus no longer being able to correct for blurring due to camera motion, then the portion of a given frame interval that may be dedicated to the image sensor integration/exposure period may be increased-thereby allowing for the capture of images in darker scene environments, and/or more complimentary/secondary captures being able to be captured within the same frame interval, which could also help to reduce image noise and/or increase the dynamic range of the captured images.

Other potential benefits of the per-frame recentering techniques disclosed herein include: power savings, reduced jitter, and reduced distortion in the final video files asset, e.g., due to the OIS system being closer to the center position (i.e., exhibiting less displacement amplitude) for a greater portion of the time interval during which the video image stream asset is being captured.

Figure 2A:
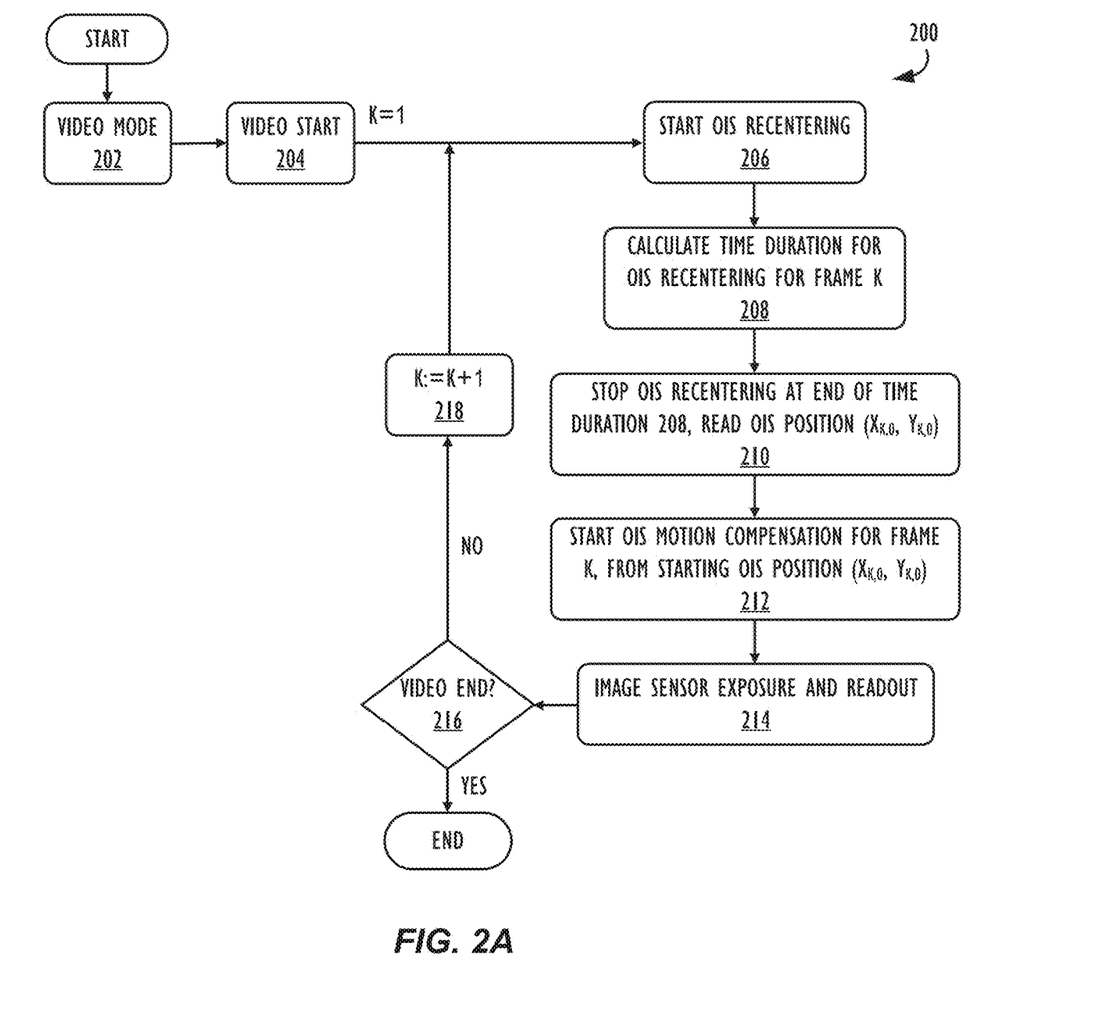
FIG. 2A is a flow chart illustrating a method of performing per-video image frame OIS recentering operations with a relatively short image sensor recentering period, according to various embodiments.

Exemplary Methods for Performing Optical Image Stabilization Operations with Per-Image Frame Recentering Referring now to FIG. 2A, a process 200 of performing per-video image frame OIS recentering operations with a relatively short image sensor recentering period may begin at block 202 by initiating a video image stream capture mode. Next, at block 204, the video image stream capture may be initiated. At this point, a frame counter, k, which will be used herein for illustrative purposes, may be initialized to a value of 1. Next, at block 206, an image sensor recentering period may begin, during which the OIS system moves the image sensor towards a center position relative to the first lens. According to some embodiments, at block 208, the process 200 may calculate a time duration that is available for the OIS recentering operation to be performed for image frame k. As explained herein, this available time duration may be based on, e.g., the overall frame interval duration, a maximum amount of the frame interval that may taken up by the image sensor's integration (i.e., exposure time), the number of individual captures that may need to be taken during a single frame interval, the readout times of the image sensor, any OIS "settling" or "overshoot" times that need to be accounted for (i.e., the amount of time it actually takes an OIS system to come to a rest after it has been controlled to stop moving), etc. As such, the amount of time available for the OIS recentering operation may change from frame to frame.

Next, at block 210, the process 200 may stop the OIS recentering operations at the end of the time duration calculated in block 208. At that time, the device may read the OIS system's current position, which may be indicated as: $(x_{k,0}, y_{k,0})$. Next, at block 212, the OIS system may begin (i.e., from its starting position at the aforementioned $(x_{k,0}, y_{k,0})$) the normal process of performing motion compensation during the capture and readout of image frame k (i.e., at block 214).

Finally, at block 216, the process 200 determines if the video image stream capture has ended (e.g., based on an indication of a user, running out of memory, exceeding a thermal limit, etc.). If the video capture has not ended (i.e., "NO" at block 216), the process 200 may proceed to block 218 to increment the value of the image frame counter, k, by 1, and then return to block 206, i.e., to begin the image sensor recentering period for the next image frame interval, and repeat the process of steps 206-214 over again. If, instead, the video capture has ended (i.e., "YES" at block 216), the process 200 may end.

Figure 2B:
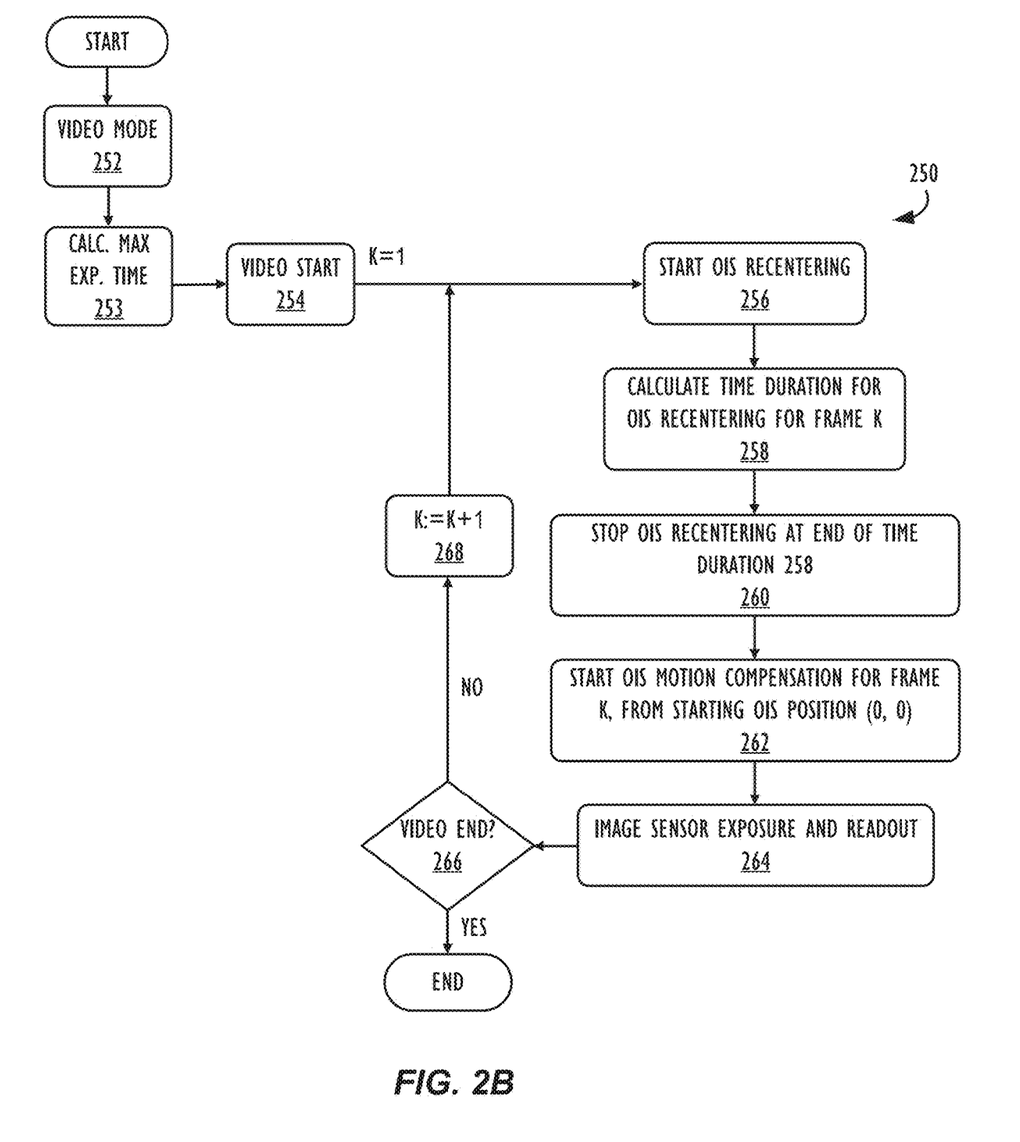
FIG. 2B is a flow chart illustrating a method of performing per-video image frame OIS recentering operations with a relatively long image sensor recentering period, according to various embodiments.

Referring now to FIG. 2B, a process 250 of performing per-video image frame OIS recentering operations with a relatively long image sensor recentering period may begin at block 252 by initiating a video image stream capture operation. According to some embodiments, at block 253, the process 250 may calculate (and set) a maximum integration time for the sensor, i.e., a duration of time that sets an upper bound on the amount of time during any individual frame interval that the image sensor may spend actively exposing/integrating captured photos. As will be described herein, other portions of the frame interval are preferably reserved for other operations, such as OIS recentering operations, image sensor readout, etc.

Next, at block 254, the video image stream capture may be initiated. At this point, the frame counter, k, may be initialized to a value of 1. Next, at block 256, an image sensor recentering period may begin, during which the OIS system moves the image sensor towards a center position relative to the first lens. According to some embodiments, at block 258, the process 250 may calculate a time duration that is available for the OIS recentering operation to be performed for image frame k. Next, at block 260, the OIS system may stop the recentering operations at the end of the time duration calculated in block 258. In the example of process 250, at that time, e.g., due to the relatively long image sensor recentering period available in this example, the device's OIS system may have had sufficient time to move all the way to a recentered position, which may be indicated as: (0, 0). Next, at block 262, the OIS system may begin (i.e., from its starting position at the aforementioned (0, 0)) the normal process of performing motion compensation during the capture and readout of image frame k (i.e., at block 264).

Finally, at block 266, the process 250 determines if the video image stream capture has ended (e.g., based on an indication of a user, running out of memory, exceeding a thermal limit, etc.). If the video capture has not ended (i.e., "NO" at block 266), the process 250 may proceed to block 268 to increment the value of the image frame counter, k, by 1, and then return to block 256, i.e., to begin the image sensor recentering period for the next image frame interval, and repeat the process of steps 256-264 over again. If, instead, the video capture has ended (i.e., "YES" at block 266), the process 250 may end.

Figure 3:
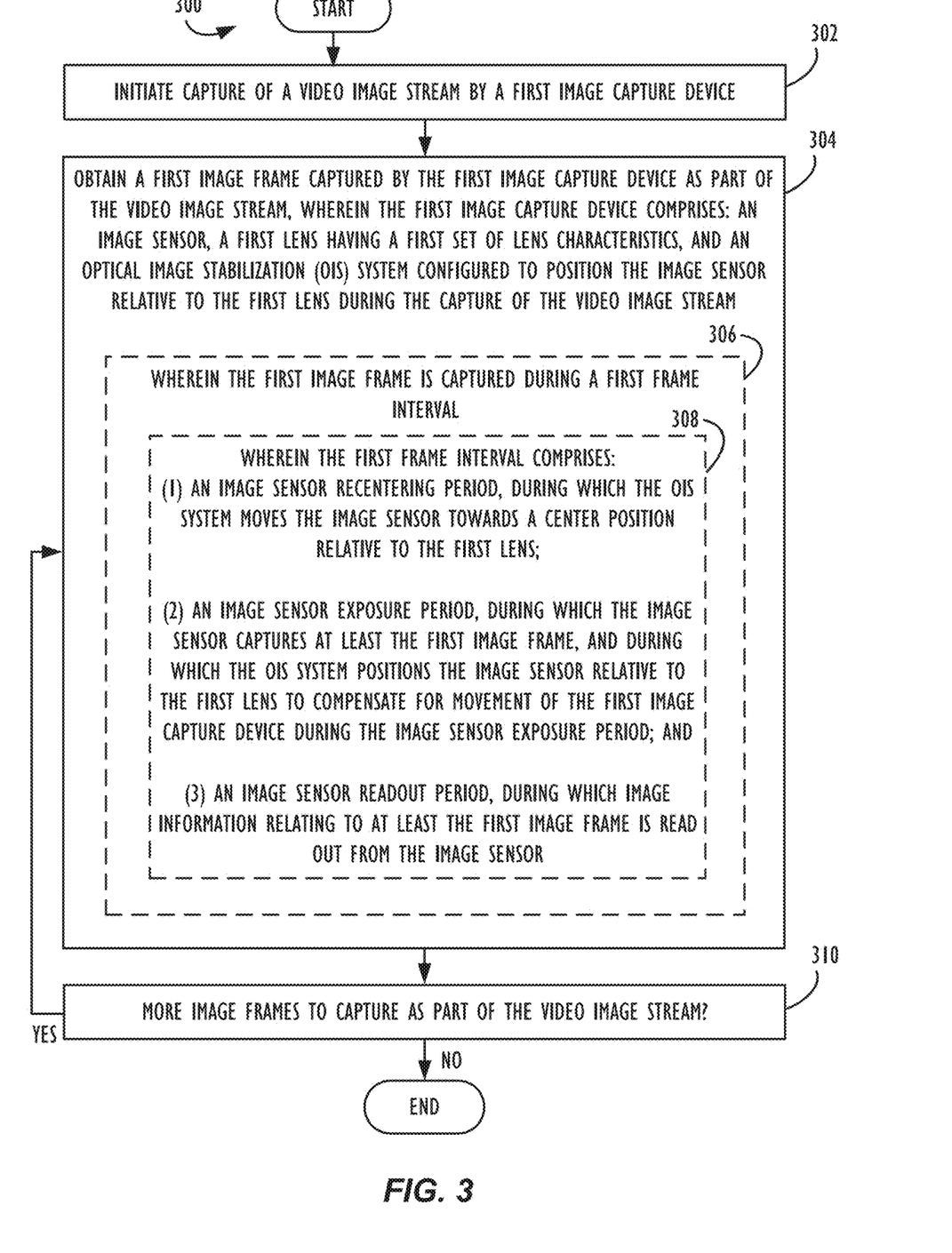
FIG. 3 is a flow chart illustrating a method of performing optical image stabilization operations with per-image frame recentering operations, according to various embodiments.

Referring now to FIG. 3, a method 300 of performing optical image stabilization (OIS) operations with per-image frame recentering operations is shown in flowchart form, according to various embodiments. First, at Step 302, the method 300 may initiate the capture of a video image stream by a first image capture device.

Next, at Step 304, the method 300 may continue by obtaining a first image frame captured by the first image capture device as part of the video image stream, wherein the first image capture device comprises: an image sensor, a first lens having a first set of lens characteristics (e.g., lens pitch, reflective coating, magnification, spatial resolution, etc.), and an optical image stabilization (OIS) system configured to position the image sensor relative to the first lens during the capture of the video image stream.

At block 306, it is further specified that, according to some embodiments, the first image frame is captured during a first frame interval.

At block 308, it is further specified that, according to some embodiments, the first frame interval comprises: (1) an image sensor recentering period, during which the OIS system moves the image sensor towards a center position relative to the first lens; (2) an image sensor exposure period, during which the image sensor captures at least the first image frame, and during which the OIS system positions the image sensor relative to the first lens to compensate for movement of the first image capture device during the image sensor exposure period; and (3) an image sensor readout period, during which image information relating to at least the first image frame is read out from the image sensor.

Finally, at Step 310, the method 300 may continue by evaluating whether there are more image frames to capture as part of the video image stream. If there are more image frames to be captured (i.e., "YES" at Step 310), the method 300 may return to Step 304. If, instead, there are no more image frames to be captured (i.e., "NO" at Step 310), the method 300 may end.

Exemplary Electronic Computing Devices

Figure 4:
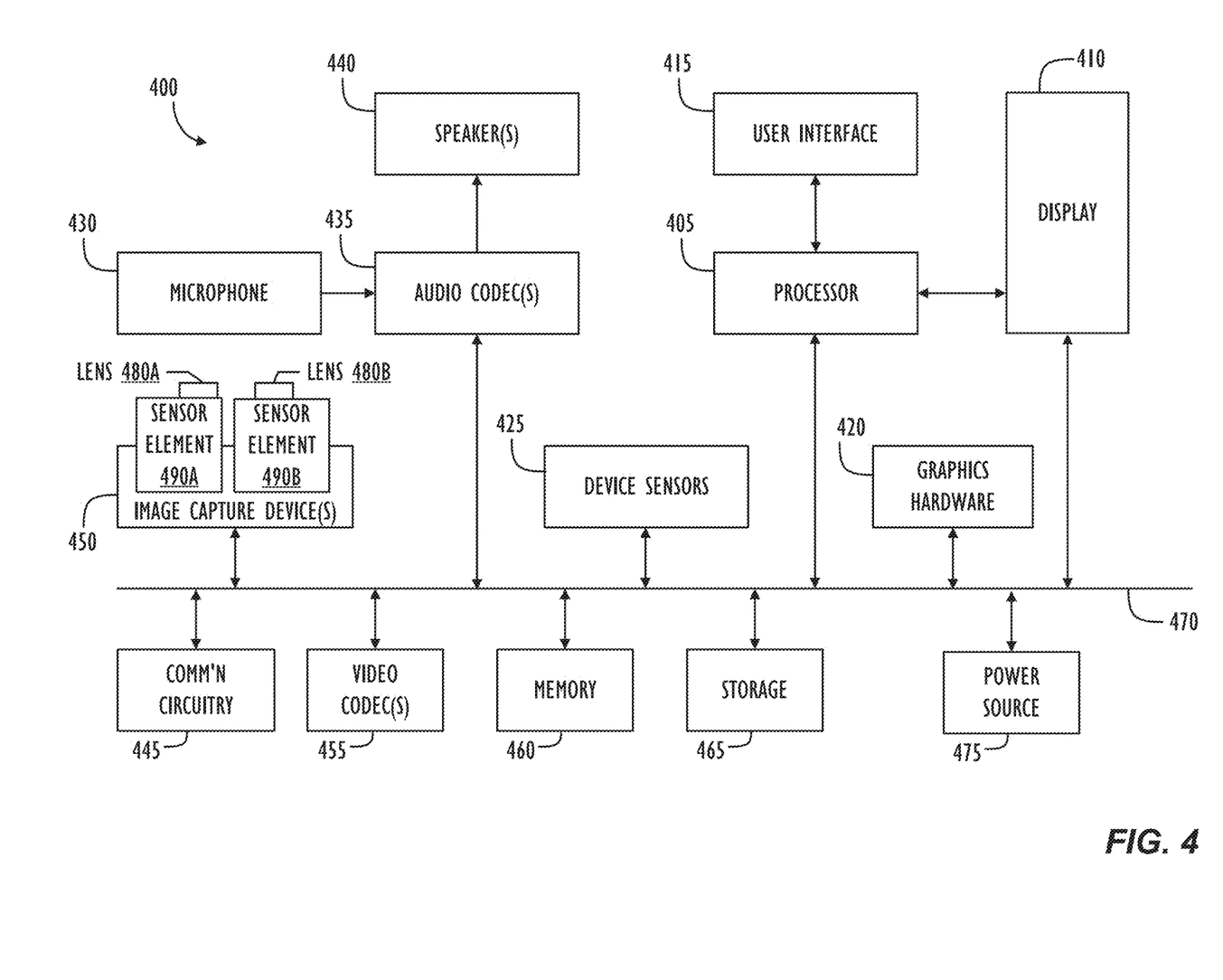
FIG. 4 is a block diagram illustrating a programmable electronic computing device, in which one or more of the techniques disclosed herein may be implemented.

Referring now to FIG. 4, a simplified functional block diagram of illustrative programmable electronic computing device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer, inertial measurement unit, and/or gyroscope), microphone 430, audio codec(s) 435, speaker(s) 440, communications circuitry 445, image capture device(s) 450, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the capture and/or processing of digital video images in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular image frame(s) that the user would like to capture (e.g., by clicking on a physical or virtual button at the moment the desired image frame is being displayed on the device's display screen).

In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip (SOC) such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 450 may comprise one or more camera units configured to capture images, e.g., images which may be processed to generate enhanced versions of said captured images, e.g., in accordance with this disclosure. Image capture device(s) 450 may include two (or more) lens assemblies 480A and 480B, where each lens assembly may have a separate focal length (as well as various other different image capture properties, such as capture rate, resolution, optical stabilization systems, etc., as discussed above). For example, lens assembly 480A may have a shorter focal length relative to the focal length of lens assembly 480B. Each lens assembly may have a separate associated sensor element, e.g., sensor elements 490A/490B. Alternatively, two or more lens assemblies may share a common sensor element. Image capture device(s) 450 may capture still and/or video images. Output from image capture device(s) 450 may be processed, at least in part, by video codec(s) 455 and/or processor 405 and/or graphics hardware 420, and/or a dedicated image processing unit or image signal processor incorporated within image capture device(s) 450. Images so captured may be stored in memory 460 and/or storage 465.

Memory 460 may include one or more different types of media used by processor 405, graphics hardware 420, and image capture device(s) 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein. Power source 475 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 400.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a first image capture device, wherein the first image capture device comprises an image sensor; and a first lens having a first set of lens characteristics;
an optical image stabilization (OIS) system configured to position the image sensor relative to the first lens during the capture of a video image stream;
a memory; and
one or more processors operatively coupled to the memory, wherein the one or more processors are configured to execute instructions causing the one or more processors to:
obtain a first image frame captured by the first image capture device as part of the video image stream,
wherein the first image frame is captured during a first frame interval, and
wherein the first frame interval comprises:
an image sensor recentering period, during which the OIS system moves the image sensor towards a center position relative to the first lens;
an image sensor exposure period, during which the image sensor captures at least the first image frame, and during which the OIS system positions the image sensor relative to the first lens to compensate for movement of the first image capture device during the image sensor exposure period; and
an image sensor readout period, during which image information relating to at least the first image frame is read out from the image sensor.

2. The device of claim 1, wherein the image sensor recentering period occurs prior to the image sensor exposure period and the image sensor readout period within the first frame interval.

3. The device of claim 1, wherein a duration of the image sensor recentering period is determined dynamically, based, at least in part, on a duration of the image sensor exposure period for the first frame interval.

4. The device of claim 1, wherein a maximum duration of the image sensor exposure period is determined dynamically.

5. The device of claim 1, wherein the image sensor recentering period comprises an image sensor overshoot period and an image sensor settling period.

6. The device of claim 1, wherein the OIS system moving the image sensor towards a center position relative to the first lens during the image sensor recentering period further comprises: moving the image sensor to a first position that is partially to the center position.

7. The device of claim 6, wherein the first position becomes a starting position for the OIS system to compensate for movement of the first image capture device during the image sensor exposure period.

8. The device of claim 1, wherein the OIS system moving the image sensor towards a center position relative to the first lens during the image sensor recentering period further comprises: moving the image sensor to the center position.

9. The device of claim 1, wherein the image sensor exposure period further comprises the image sensor capturing a second image frame using a different integration time than was used for the first image frame.

10. The device of claim 1, wherein the OIS system further comprises a gimbal actuator.

11. The device of claim 1, wherein the one or more processors are further configured to execute instructions causing the one or more processors to:
obtain a second image frame captured by the first image capture device subsequently to the first image frame as part of the video image stream,
wherein the second image frame is captured during a second frame interval, and
wherein the second frame interval comprises:
a second image sensor recentering period, during which the OIS system moves the image sensor towards a center position relative to the first lens;
a second image sensor exposure period, during which the image sensor captures at least the second image frame, and during which the OIS system positions the image sensor relative to the first lens to compensate for movement of the first image capture device during the second image sensor exposure period; and
a second image sensor readout period, during which image information relating to at least the second image frame is read out from the image sensor.

12. The device of claim 11, wherein the image sensor recentering period for the first frame interval has a different duration than the second image sensor recentering period for the second frame interval.

13. A non-transitory computer readable medium comprising computer readable instructions executable by one or more processors to:
initiate capture of a video image stream by a first image capture device; and
obtain a first image frame captured by the first image capture device as part of the video image stream, wherein the first image capture device comprises: an image sensor; a first lens having a first set of lens characteristics; and an optical image stabilization (OIS) system configured to position the image sensor relative to the first lens during the capture of the video image stream,
wherein the first image frame is captured during a first frame interval, and
wherein the first frame interval comprises:
an image sensor recentering period, during which the OIS system moves the image sensor towards a center position relative to the first lens;
an image sensor exposure period, during which the image sensor captures at least the first image frame, and during which the OIS system positions the image sensor relative to the first lens to compensate for movement of the first image capture device during the image sensor exposure period; and
an image sensor readout period, during which image information relating to at least the first image frame is read out from the image sensor.

14. The non-transitory computer readable medium of claim 13, wherein the image sensor recentering period occurs prior to the image sensor exposure period and the image sensor readout period within the first frame interval.

15. The non-transitory computer readable medium of claim 13, wherein a duration of the image sensor recentering period is determined dynamically, based, at least in part, on a duration of the image sensor exposure period for the first frame interval.

16. The non-transitory computer readable medium of claim 13, wherein a maximum duration of the image sensor exposure period is determined dynamically.

17. The non-transitory computer readable medium of claim 13, wherein the OIS system moving the image sensor towards a center position relative to the first lens during the image sensor recentering period further comprises: moving the image sensor to a first position that is partially to the center position.

18. The non-transitory computer readable medium of claim 17, wherein the first position becomes a starting position for the OIS system to compensate for movement of the first image capture device during the image sensor exposure period.

19. An image processing method, comprising:
   initiating capture of a video image stream by a first image capture device; and
   obtaining a first image frame captured by the first image capture device as part of the video image stream, wherein the first image capture device comprises: an image sensor; a first lens having a first set of lens characteristics; and an optical image stabilization (OIS) system configured to position the image sensor relative to the first lens during the capture of the video image stream,
   wherein the first image frame is captured during a first frame interval, and
   wherein the first frame interval comprises:
      an image sensor recentering period, during which the OIS system moves the image sensor towards a center position relative to the first lens;
      an image sensor exposure period, during which the image sensor captures at least the first image frame, and during which the OIS system positions the image sensor relative to the first lens to compensate for movement of the first image capture device during the image sensor exposure period; and
      an image sensor readout period, during which image information relating to at least the first image frame is read out from the image sensor.

20. The method of claim 19, wherein the image sensor recentering period occurs prior to the image sensor exposure period and the image sensor readout period within the first frame interval.

* * * * *